(12) United States Patent
Xu et al.

(10) Patent No.: US 11,451,807 B2
(45) Date of Patent: Sep. 20, 2022

(54) METHOD AND APPARATUS FOR VIDEO CODING

(71) Applicant: Tencent America LLC, Palo Alto, CA (US)

(72) Inventors: Meng Xu, San Jose, CA (US); Xiang Li, Los Gatos, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 96 days.

(21) Appl. No.: 16/435,034

(22) Filed: Jun. 7, 2019

(65) Prior Publication Data
US 2020/0053372 A1 Feb. 13, 2020

Related U.S. Application Data

(60) Provisional application No. 62/716,307, filed on Aug. 8, 2018.

(51) Int. Cl.
*H04N 19/44* (2014.01)
*H04N 19/105* (2014.01)
(Continued)

(52) U.S. Cl.
CPC .......... *H04N 19/44* (2014.11); *H04N 19/105* (2014.11); *H04N 19/132* (2014.11);
(Continued)

(58) Field of Classification Search
None
See application file for complete search history.

(56) References Cited

U.S. PATENT DOCUMENTS 9,900,594 B2 * 2/2018 Shiodera ................ H04N 19/51
2004/0057523 A1 * 3/2004 Koto ..................... H04N 19/132
375/240.26
(Continued)

FOREIGN PATENT DOCUMENTS

JP 2012186759 A * 9/2012
KR 20150024361 A * 3/2015

OTHER PUBLICATIONS

Steffen Kamp et al. "Decoder side motion vector derivation for inter frame video coding", Image Processing, 2008. ICIP 2008) 15th IEEE International conference, pp. 1120-1123, Oct. 12, 2008 (Year: 2008).*

(Continued)

*Primary Examiner* — Alison Slater
*Assistant Examiner* — Shanika M Brumfield
(74) *Attorney, Agent, or Firm* — ArentFox Schiff LLP

(57) ABSTRACT

Aspects of the disclosure provide methods and apparatuses for video encoding and decoding. In some examples, an apparatus for video decoding includes processing circuitry. The processing circuitry decodes prediction information of a current block in a current picture from a coded video bitstream. The prediction information indicates an inter prediction mode for reconstructing the current block. The processing circuitry identifies a reference block for the current block where the reference block is one of a plurality of blocks in a motion vector compression unit (MVCU) that is already reconstructed. The processing circuitry further determines current motion information of the current block based on representative motion information for the MVCU and reconstructs at least one sample in the current block based on the current motion information.

13 Claims, 14 Drawing Sheets

(51) Int. Cl.
*H04N 19/176* (2014.01)
*H04N 19/132* (2014.01)
*H04N 19/159* (2014.01)
*H04N 19/137* (2014.01)

(52) U.S. Cl.
CPC ......... *H04N 19/137* (2014.11); *H04N 19/159* (2014.11); *H04N 19/176* (2014.11)

(56) References Cited

U.S. PATENT DOCUMENTS

| | | | | |
|---|---|---|---|---|
| 2011/0158320 | A1* | 6/2011 | Zheng | H04N 19/50 375/240.16 |
| 2013/0308704 | A1* | 11/2013 | Park | H04N 19/51 375/240.16 |
| 2013/0315571 | A1* | 11/2013 | Park | H04N 19/176 386/329 |
| 2018/0098072 | A1* | 4/2018 | Zhang | H04N 19/107 |

OTHER PUBLICATIONS

Machine translation of JP 2012-186759 (Year: 2012).*
High Efficiency Video Coding, Rec. ITU-T H.265v4, Dec. 2016.
B. Bross, J. Chen, S. Liu, "Versatile Video Coding (Draft 2)", ISO/IEC JTC1/SC29/WG11 JVET-K1001, Jul. 2018.
S. Esenlik, Y.-W. Chen, F. Chen, "Description of Core Experiment 9 (CE9): Decoder Side Motion Vector Derivation", ISO/IEC JTC1/SC29/WG11 JVET-K1029, Jul. 2018.
H. Yang, S. Liu, K. Zhang, "Description of Core Experiment 4 (CE4): Inter prediction and motion vector coding", ISO/IEC JTC1/SC29/WG11 JVET•K1024, Jul. 2018.

* cited by examiner

METHOD AND APPARATUS FOR VIDEO CODING

INCORPORATION BY REFERENCE

This present disclosure claims the benefit of priority to U.S. Provisional Application No. 62/716,307, "Motion Vector Compression" filed on Aug. 8, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry decodes prediction information of a current block in a current picture from a coded video bitstream. The prediction information indicates an inter prediction mode for reconstructing the current block. The processing circuitry identifies a reference block for the current block where the reference block is one of a plurality of blocks in a motion vector compression unit (MVCU) that is already reconstructed. The processing circuitry further determines current motion information of the current block based on representative motion information for the MVCU and reconstructs at least one sample in the current block based on the current motion information.

In an embodiment, the reference block is a spatial or a temporal neighbor of the current block. The MVCU is in the current picture when the reference block is the spatial neighbor, and the MVCU is in a reference picture that is different from the current picture when the reference block is the temporal neighbor.

In an embodiment, a size of the MVCU is $2^M \times 2^N$ and a size of each of the plurality of blocks is $2^X \times 2^X$, where M, N, and X are positive integers, and X is less than either M or N. Prior to determining the current motion information, the processing circuitry can select the representative motion information for the MVCU from multiple pieces of motion information corresponding to the plurality of blocks. In an example, the representative motion information occurs most frequently in the multiple of pieces of motion information corresponding to the plurality of blocks. In an example, the MVCU includes a top left $2^{M-1} \times 2^{N-1}$ part, a top right $2^{M-1} \times 2^{N-1}$ part, a bottom left $2^{M-1} \times 2^{N-1}$ part, and a bottom right $2^{M-1} \times 2^{N-1}$ part. The processing circuitry can select one of the multiple pieces of motion information that is associated with a center block of the plurality of blocks to be the representative motion information for the MVCU. The center block can be one of: (1) a bottom right block of the top left $2^{(M-1)} \times 2^{(N-1)}$ part, (2) a bottom left block of the top right $2^{(M-1)} \times 2^{(N-1)}$ part, (3) a top right block of the bottom left $2^{(M-1)} \times 2^{(N-1)}$ part, and (4) a top left block of the bottom right $2^{(M-1)} \times 2^{(N-1)}$ part. In an example, the processing circuitry can select, based on a scan order, a first available one of the multiple pieces of motion information to be the representative motion information for the MVCU where the scan order is one of: (1) a raster scan order, (2) a Z scan order, and (3) a decoding order for the MVCU. In an example, the multiple pieces of motion information includes first MVs associated with a first reference list and second MVs associated with a second reference list. The processing circuitry can select one of the first MVs occurring most frequently in the first MVs to be a representative first MV for the MVCU and select one of the second MVs occurring most frequently in the second MVs to be a representative second MV for the MVCU. Further, the processing circuitry can determine the representative motion information for the MVCU based on the representative first MV and the representative second MV.

In an embodiment, one of the plurality of blocks has no motion information. The processing circuitry can determine that motion information for the one of the plurality of blocks is unavailable. Further, the processing circuitry can set one or more MVs for the one of the plurality of blocks as zero and assign a reference index to the one of the plurality of blocks; determine the motion information for the one of the plurality of blocks from a spatial neighbor of the one of the plurality of blocks where the spatial neighbor is another one of the plurality of blocks in the MVCU; determine the motion information for the one of the plurality of blocks from a collocated block in a collocated picture; or select the representative motion information for the MVCU to be the motion information for the one of the plurality of blocks.

In an embodiment, the MVCU is included in a coding tree block (CTB). After reconstructing the CTB, the processing circuitry can select the representative motion information for the MVCU from the multiple pieces of motion information corresponding to the plurality of blocks.

In an embodiment, the MVCU is in a decoder side motion vector derivation (DMVD) mode. The multiple pieces of motion information corresponding to the plurality of blocks include unrefined pieces of motion information and refined pieces of motion information corresponding to the plurality of blocks where the refined pieces of motion information are determined from the respective unrefined pieces of motion information using the DMVD. The processing circuitry can (1) select one of the unrefined pieces of motion information to be the representative motion information for the MVCU, (2) select one of the refined pieces of motion information to be the representative motion information for the MVCU, or (3) select one of the unrefined pieces of motion information and one of the refined pieces of motion information to be the representative motion information for the MVCU. In an example, the reference block is a spatial or a temporal neighbor of the current block. When the reference block is the spatial neighbor, then the MVCU is in the current picture, the representative motion information for the MVCU includes the one of the unrefined pieces of motion information, and the processing circuitry can determine the current motion information based on the one of the unrefined pieces of motion information for the MVCU. When the reference block is the temporal neighbor, then the MVCU is in a reference picture, the representative motion information for the MVCU includes the one of the refined pieces of motion information, and the processing circuitry can determine the current motion information based on the one of the refined pieces of motion information for the MVCU.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
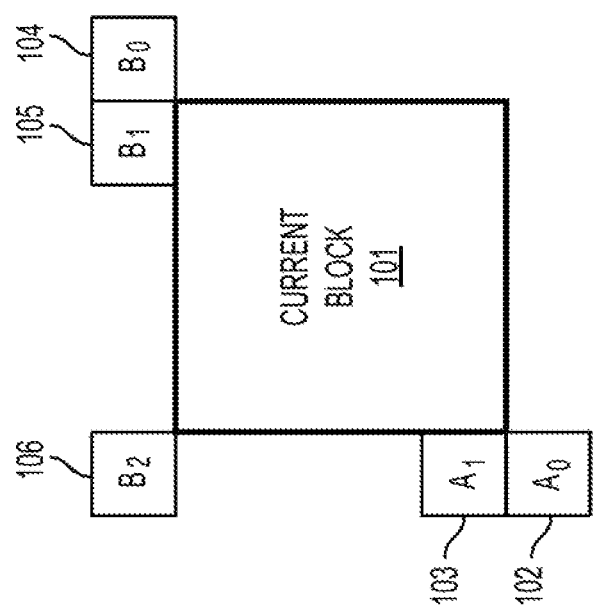
FIG. 1 is a schematic illustration of a current block and its surrounding spatial merge candidates in one example.
Figure 2:
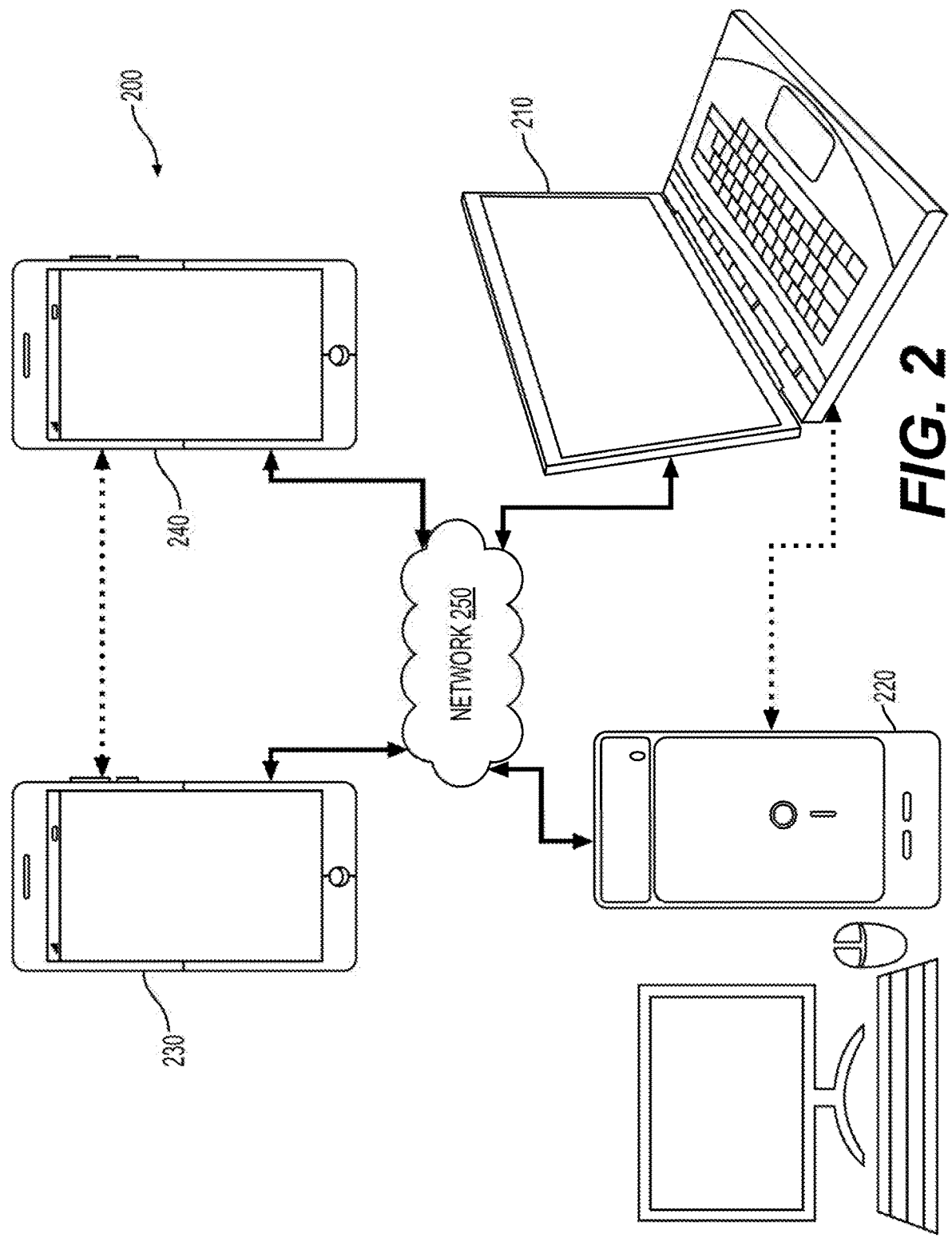
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200)

includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
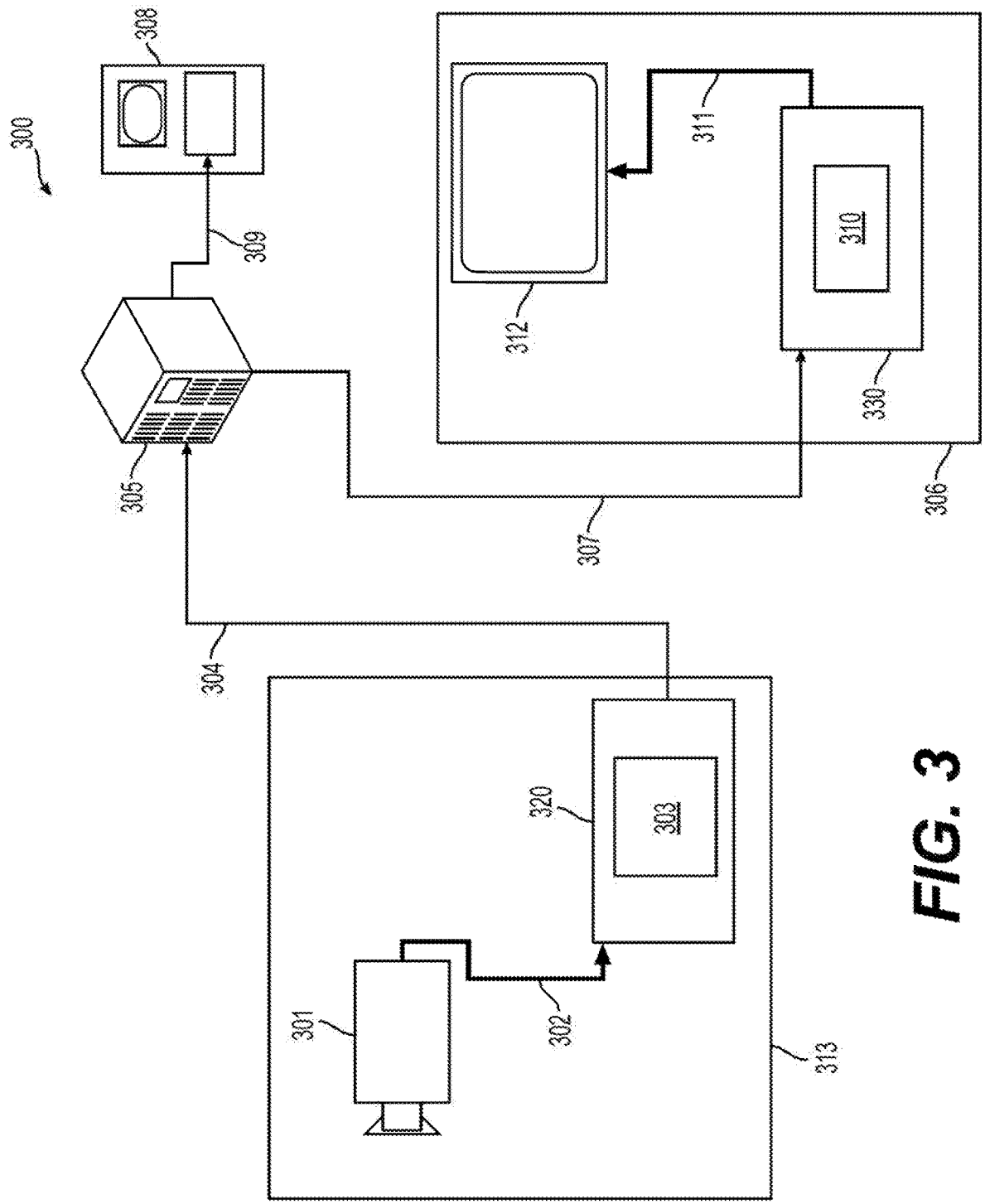
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
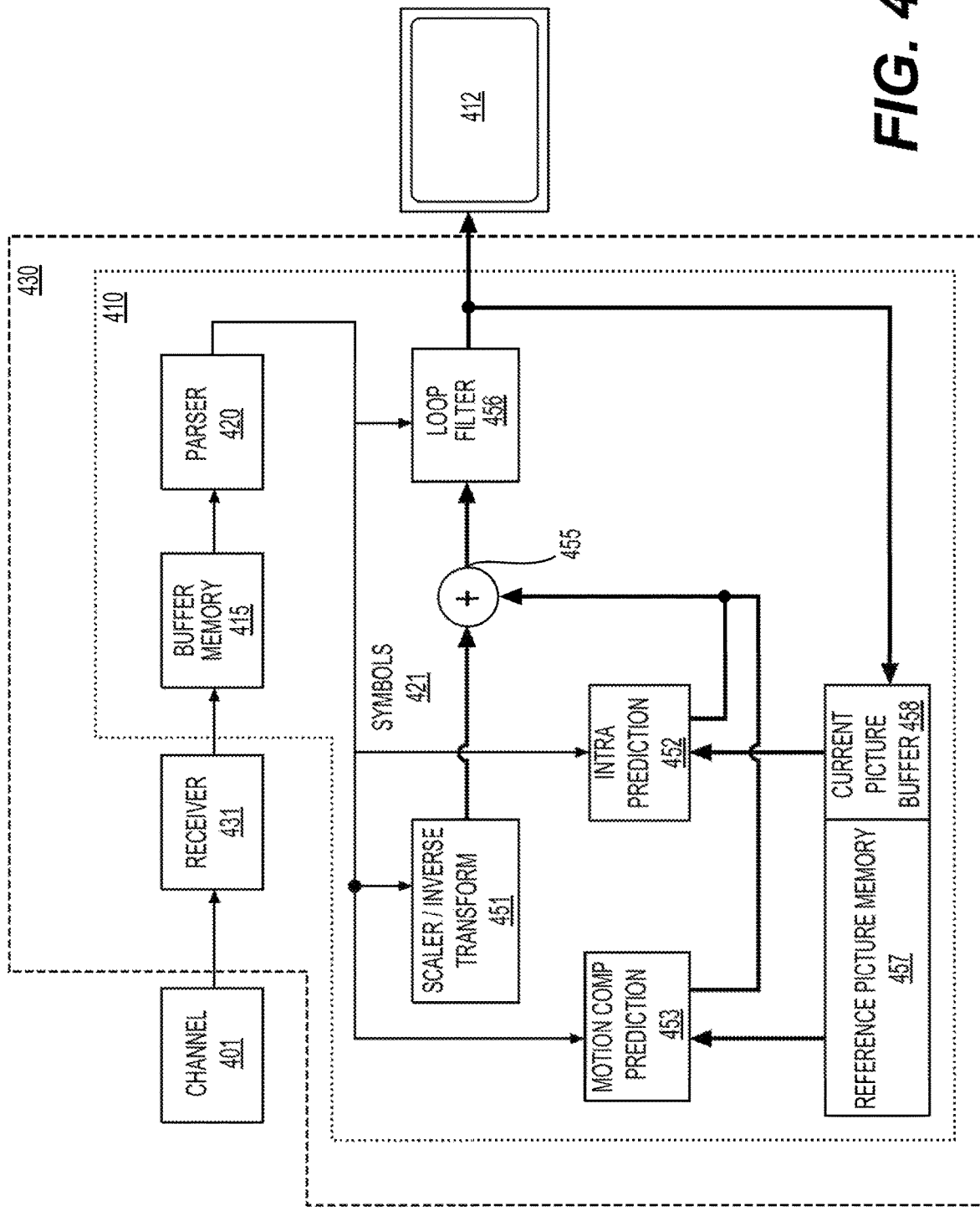
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
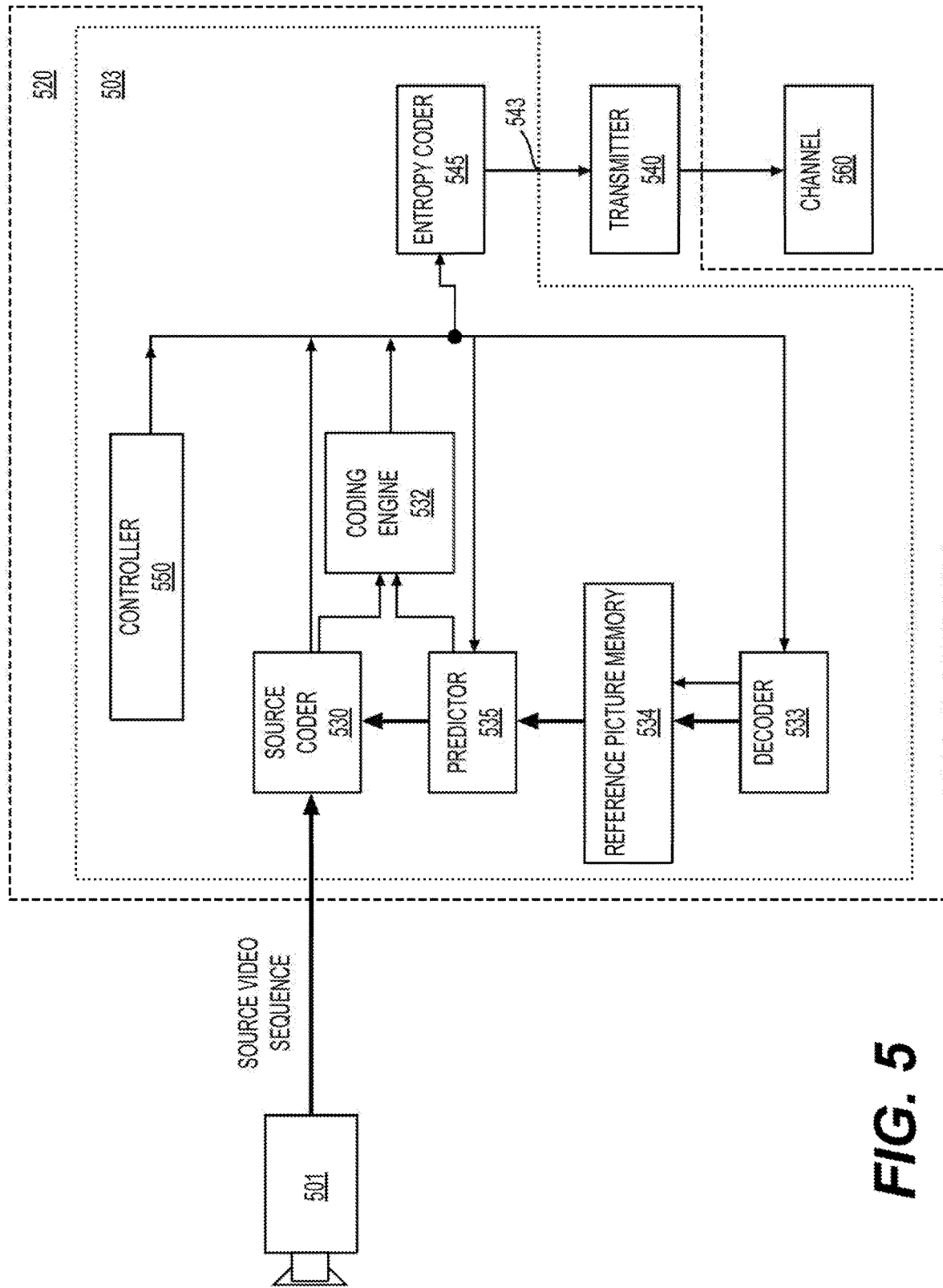
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
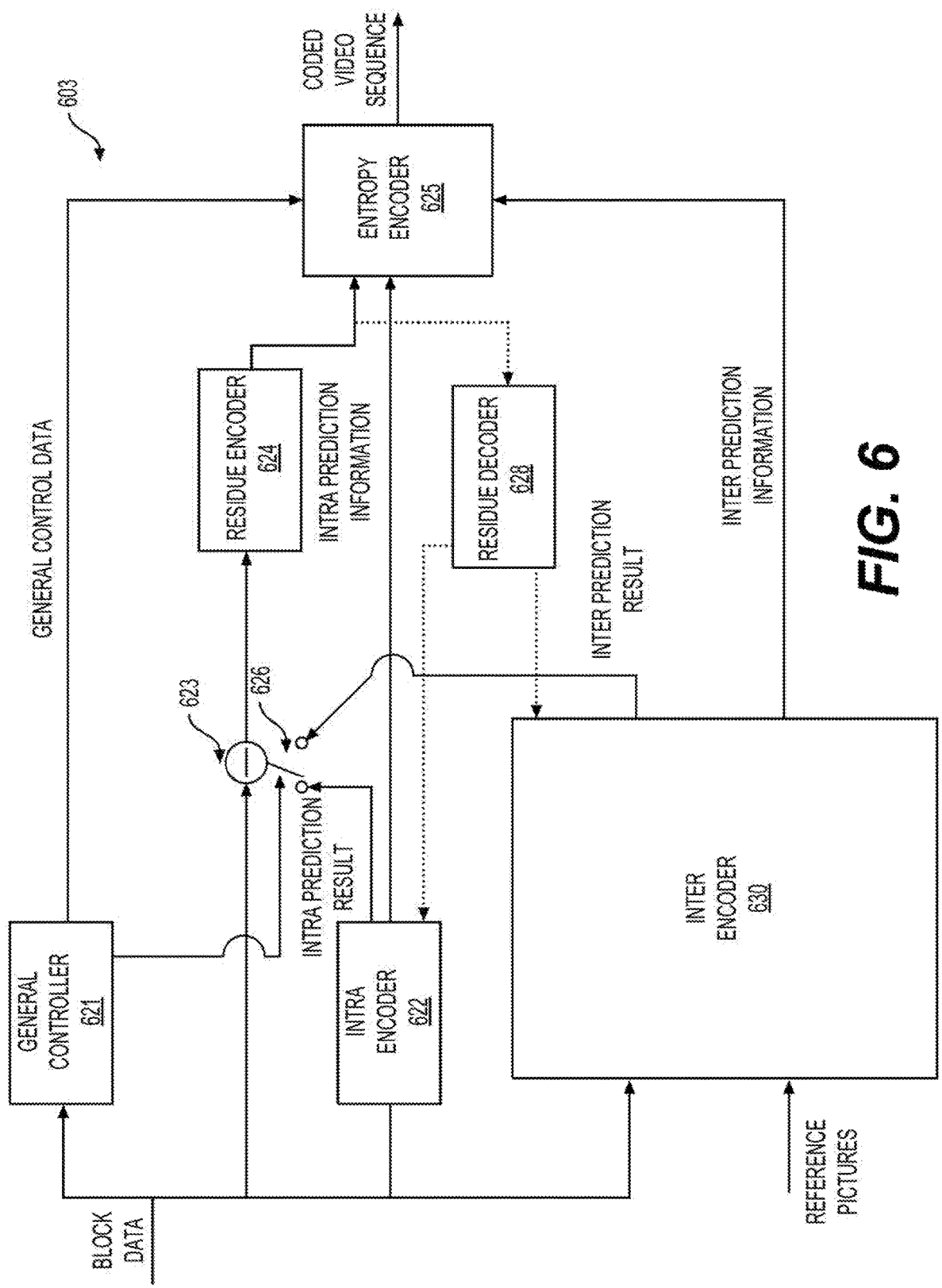
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
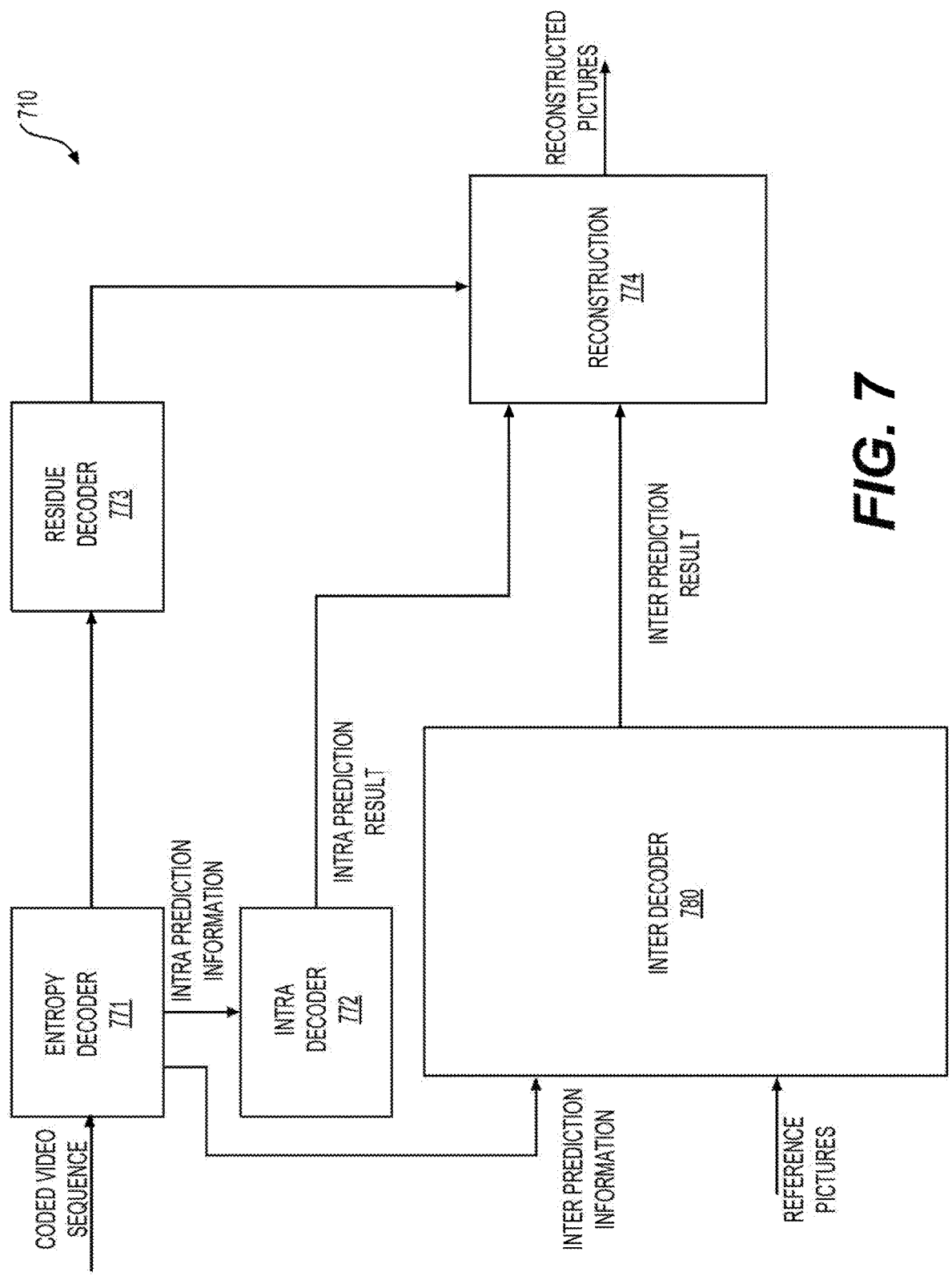
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

According to an aspect of the disclosure, decoder side motion vector refinement (DMVR) is one of decoder side motion vector derivation (DMVD) techniques and is used to improve/refine one or more MVs based on starting points.

In some examples, in the case of bi-prediction operation, for the prediction of one block region, two prediction blocks, formed respectively using an MV0 of a first candidate list and an MV1 of a second candidate list, are combined to form a single prediction signal. In the DMVR method, the two motion vectors MV0 and MV1 of the bi-prediction are further refined by a bilateral matching process. The bilateral matching is applied in the decoder to perform a distortion-based search between the reconstruction samples in reference pictures associated with the MV0 and the MV1 to obtain refined MVs without transmission of additional motion information.

In some examples, DMVR is applied for the merge mode of bi-prediction with one MV from a reference picture in the past and another MV from a reference picture in the future, without the transmission of additional syntax elements. In an example, DMVR is applied in the merge mode and skip mode, when the condition in (Eq. 1) is true:

$$(POC-POC0)\times(POC-POC1)<0 \quad (Eq.\ 1)$$

where POC denotes picture order count of the current picture, and POC0 and POC1 denote picture order counts of the two reference pictures for the current picture.

In some embodiments, based on signals in the received bitstream, a pair of merge candidates is determined and used as input to a DMVR process. For example, the pair of merge candidates is denoted as initial motion vectors (MV0, MV1). In some examples, the search points that are searched by DMVR obey a motion vector difference (MVD) mirroring condition. In other words, the points that are checked by DMVR, denoted by a pair of candidate motion vectors (MV0', MV1'), obey (Eq. 2) and (Eq. 3):

$$MV0'=MV0+MV_{diff} \quad (Eq.\ 2)$$

$$MV1'=MV1-MV_{diff} \quad (Eq.\ 3)$$

where $MV_{diff}$ denotes a MVD between a candidate motion vector, such as the MV0', and an initial motion vector, such as the MV0, in one of the reference pictures.

Figure 8:
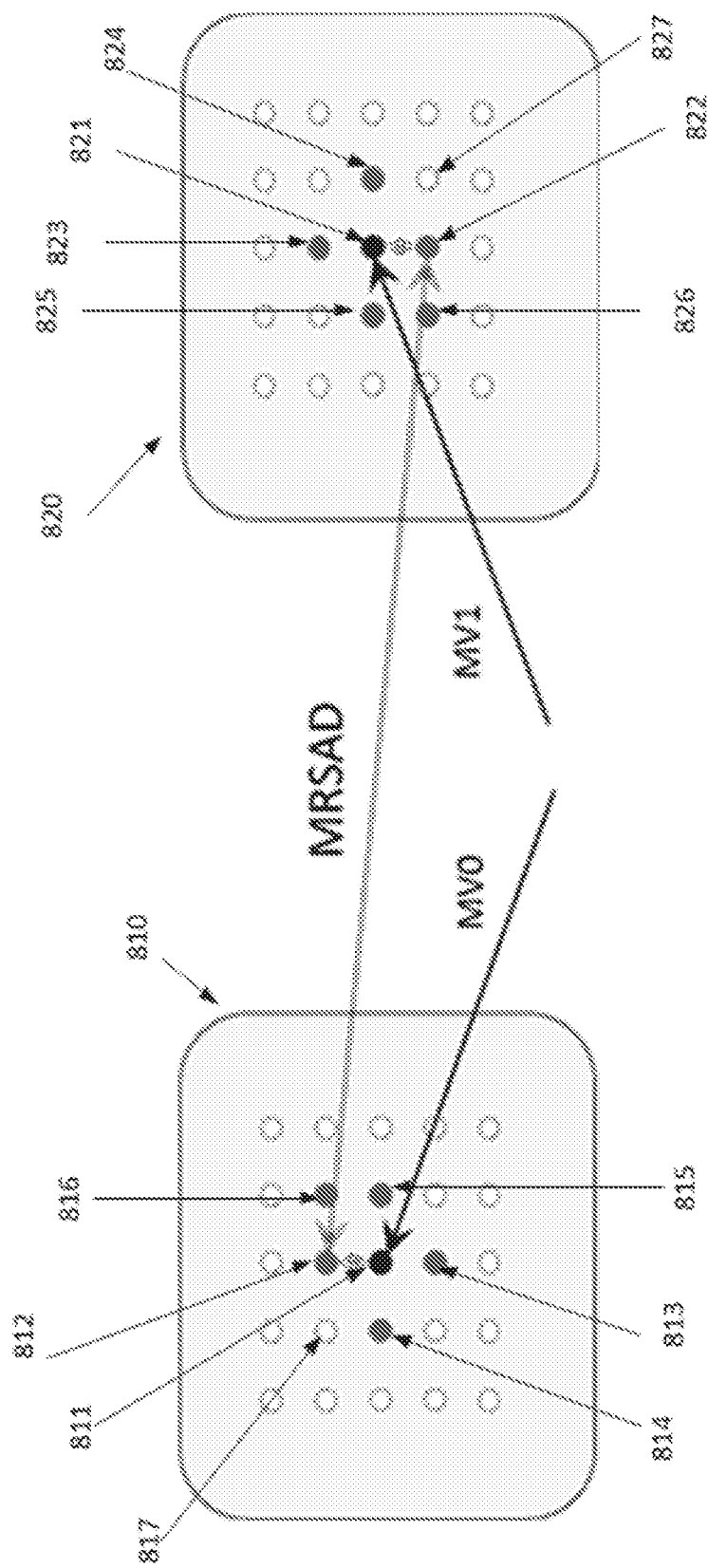
FIG. 8 shows a diagram of a first portion (810) of a search space in a first reference picture and a second portion (820) of a search space in a second reference picture according to an embodiment of the disclosure.

FIG. 8 shows a diagram of a first portion (810) of a search space in a first reference picture and a second portion (820) of a search space in a second reference picture according to an embodiment of the disclosure. In an example, the bilateral matching is applied to perform a distortion-based search between the reconstruction samples of the first portion (810) and the second portion (820). An initial motion vector MV0 points to a point (811) in the first portion (810) of the search space, and an initial motion vector MV1 points to a point (821) in the second portion (820) of the search space. Further, a candidate motion vector MV0' (not shown) points to a point (812) in the first portion (810) of the search space, and a candidate motion vector MV1' (not shown) points to a point (822) in the second portion (820) of the search space. The points (812) and (822) satisfy the motion vector difference mirroring condition. Similarly, points (813) and (823) satisfy the motion vector difference mirroring condition; points (814) and (824) satisfy the motion vector difference mirroring condition; points (815) and (825) satisfy the motion vector difference mirroring condition; and points (816) and (826) satisfy the motion vector difference mirroring condition. In the FIG. 9 example, 6 pairs of search points are selected in the search space, and the points (811) and (821) are referred to as central points of the search space.

In some examples, after the construction of the search space, the uni-lateral predictions are respectively performed on the search points in the first portion (810) and the second portion (820) of the search space using interpolation filters, such as discrete cosine transform interpolation filter (DC-TIF). Further, a bilateral matching cost function is calculated by using a mean reduced sum of average difference (MR-SAD) between the two uni-lateral predictions for each pair of the search points, and then pair of the search points that results in the minimum cost is selected as the refined MV pair. In an example, for the MRSAD calculation, 16-bit precision of samples is used (which is the output of the interpolation filtering), and no clipping and no rounding operations are applied before MRSAD calculation. The reason for not applying rounding and clipping is to reduce internal buffer requirement.

In some embodiments, the integer precision search points are chosen using an adaptive pattern method. In an example, a first cost (bilateral matching cost) corresponding to the central points (such as (811) and (821)) pointed by the initial motion vectors) is calculated. Four other costs, such as a cost corresponding to points (812) and (822), a cost corresponding to points (813) and (823), a cost corresponding to points (814) and (824), and a cost corresponding to points (815) and (825), are calculated. A distance from each of the points (812)-(815) to the central point (811) is an integer number of sample resolution, such as 1 pixel (1-pel), and a distance from each of the points (822)-(825) to the central point (821) is also an integer number of sample resolution.

Further, a $6^{th}$ pair of search points, such as the points (816) and (826) are chosen by a gradient of the previous calculated costs including the first cost and the four other costs. For example, when the cost corresponding to the search points (812) and (822) is smaller than the cost corresponding to the search points (813) and (823), and the cost corresponding to the search points (815) and (825) is smaller than the cost corresponding to the search points (814) and (824), then the points (816) and (826) are selected as the $6^{th}$ pair of search points. In another example, when the cost corresponding to the search points (812) and (822) is smaller than the cost corresponding to the search points (813) and (823), and the cost corresponding to the search points (814) and (824) is smaller than the cost corresponding to the search points (815) and (825), then the points (817) and (827) are selected as the $6^{th}$ pair of search points. Then, within the 6 pairs of search points, the pair of search points with the minimal cost is used to determine the refined motion vector pair (corresponding to the pair of search points with the minimal cost) that is the output of an iteration of the DMVR process.

In some embodiments, after an iteration, when the minimum cost is achieved at the central points (e.g., (811) and (821)) of the search space, i.e. the motion vectors are not changed, and the refinement process is terminated. Otherwise, the search points with the minimal cost are used as new central points to start another iteration of the DMVR process. For example, when the points (816) and (826) have the minimal cost, then the points (816) and (826) are used as new central points to continue a next iteration of DMVR process when the search range is not exceeded.

In some examples, when the integer precision search, such as the search process using integer precision search points, is terminated, half sample precision search is applied when the application of half-pel search does not exceed the search range.

Figure 9:
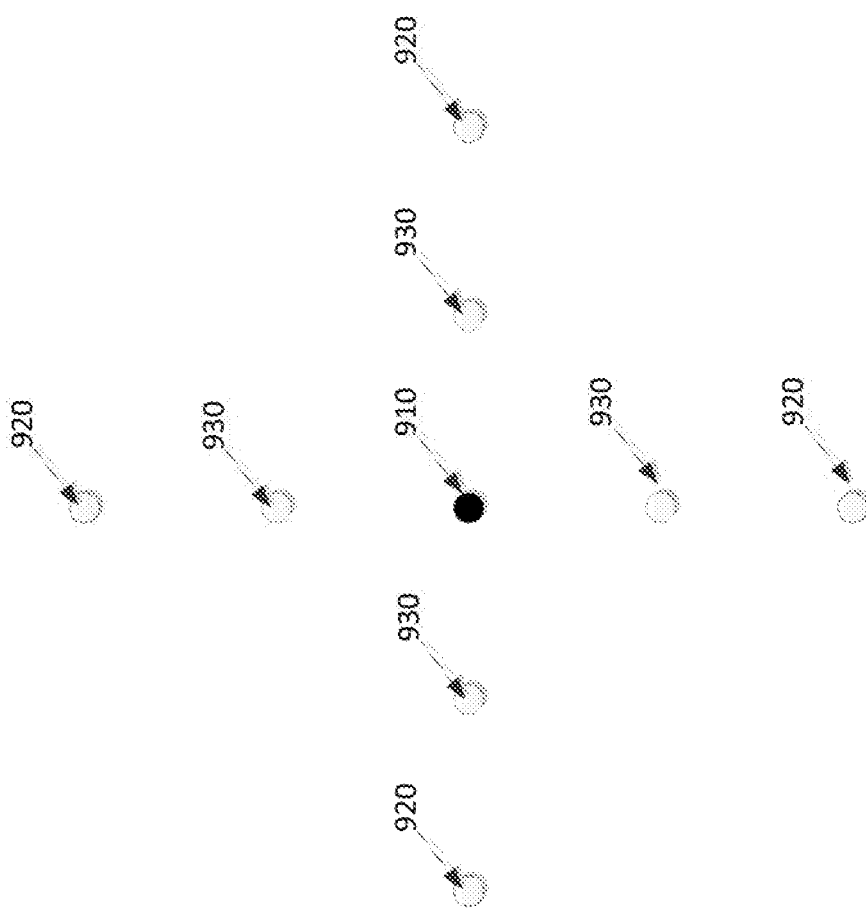
FIG. 9 shows a diagram for a half sample precision search in an example.

FIG. 9 shows a diagram for a half sample precision search in an example. Four search points (920) are distanced to a central point (910) by 1 pixel (1-pel), and can be used as integer precision search points (e.g., the points (812)-(815)). Further, four points (930) are distanced to the central point (910) by half pixel, and are used in the half-sample precision search. Similarly to the integer sample precision search, 4 MRSAD calculations are performed, corresponding to four pair of points with a half-pel distance to the central points. In an example, the central points in the half-sample precision search correspond to the refined motion vector pair that is resulted from the integer precision search with the minimal cost. A refined MV pair is output that corresponds to a minimum cost point.

Figures 10A, 10B:
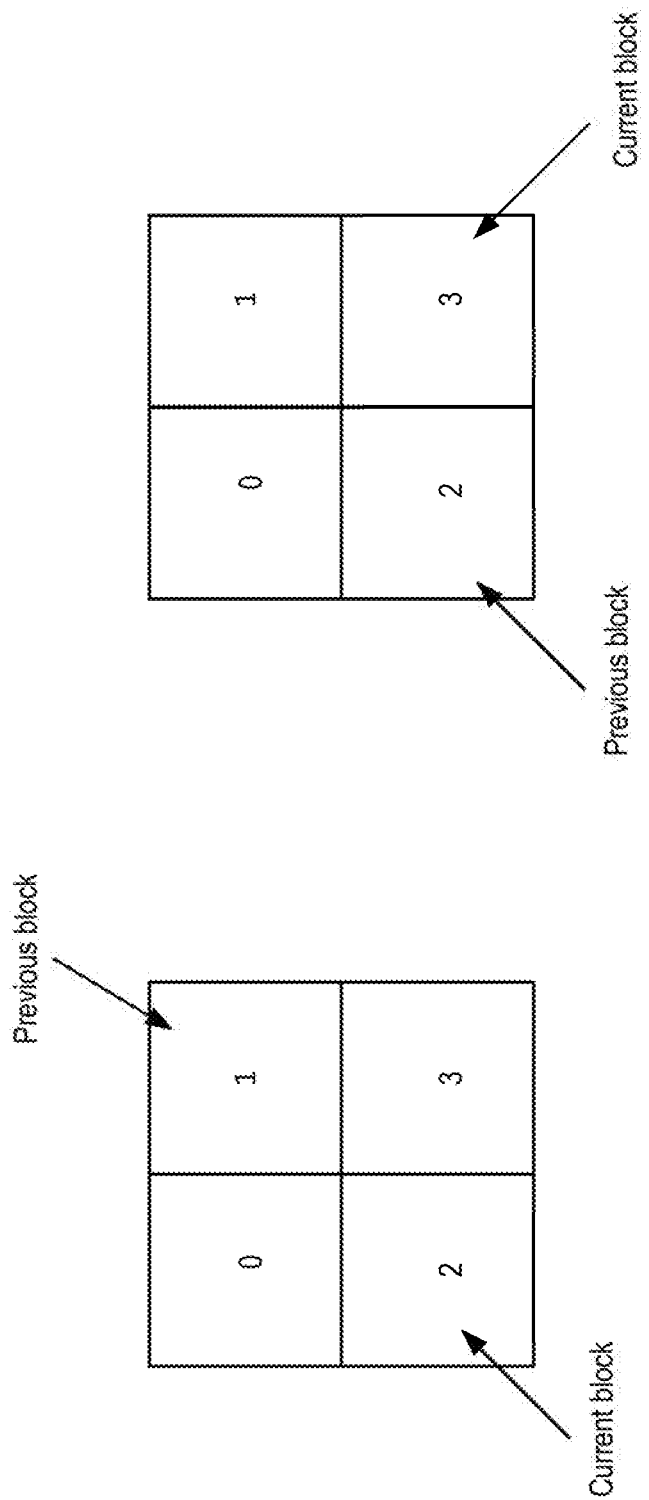
FIGS. 10A-10B show examples of spatial relationship between a current block and a previous block of the current block with a decoding order from a block 0 to a block 3.

FIGS. 10A-10B show examples of spatial relationship between a current block and a previous block of the current block with a decoding order from a block 0 to a block 3. The decoding order can be known by both an encoder and a decoder. When decoding the current block, MVs of spatial neighbors of the current block can be used as MV predictors for decoding a MV of the current block. For example, MVs from the blocks 0, 1, 2 can be the MV prediction candidates for the block 3 in FIG. 10B example. In FIG. 10A, the current block is the block 2, and the block 1 is the previous block immediately decoded before the block 2 based on the decoding order. Similarly, In FIG. 10B, the current block is the block 3, and the block 2 is the previous block immediately decoded before the block 3 based on the decoding order.

According to some embodiments, a deblocking filtering process is performed for each CU in a same order as the decoding process. The deblocking filtering process may include filtering vertical edges (horizontal filtering), and then filtering horizontal edges (vertical filtering). The vertical edges can also be referred to as the vertical boundaries, and the horizontal edges can also be referred to as the horizontal boundaries. Filtering may be applied to 8×8 block boundaries which are determined to be filtered, both for luma and chroma components. 4×4 block boundaries may not be processed in order to reduce the complexity.

In some embodiments, a boundary strength (BS) reflects how strong a filtering process may be needed for the boundary. A value of 2 for the BS indicates strong filtering, a value of I for the BS indicates weak filtering, and a value of 0 indicates no deblocking filtering. P and Q may be regarded as blocks which are involved in the deblocking filtering, where P may represent the block located to the left of (a vertical edge case) or above (a horizontal edge case) the boundary, and Q may represent the block located to the right of (the vertical edge case) or below (the horizontal edge case) the boundary.

Figure 11:
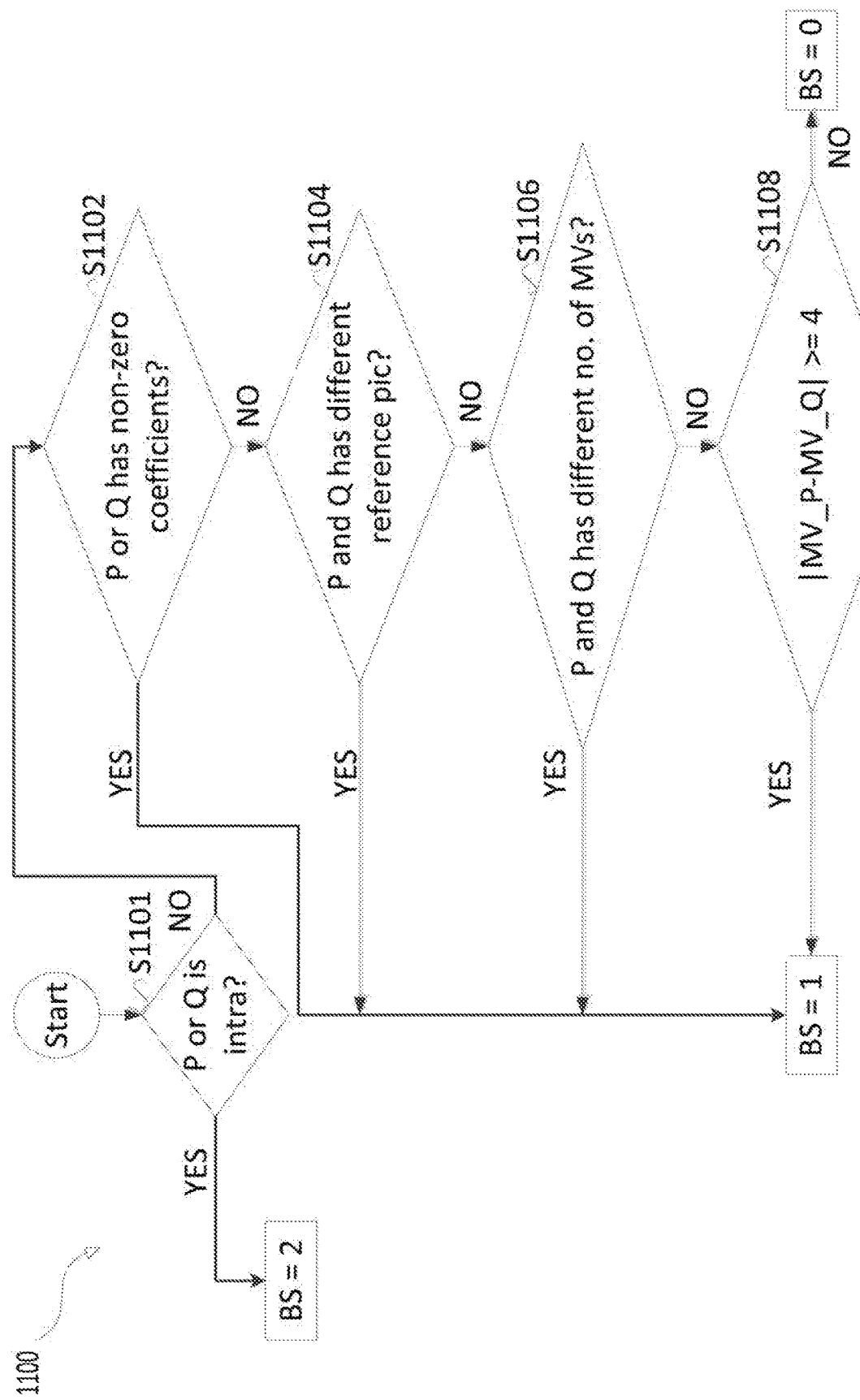
FIG. 11 illustrates an embodiment of a process (1100) for calculating a BS value.

FIG. 11 illustrates an embodiment of a process (1100) for calculating a BS value. The process may be performed by a decoder such as the decoder (710). The process (1100) can start at (S1101) to determine whether a P block or Q block is encoded in an intra mode. If either the P block or Q block is encoded in the intra mode, the BS value is set to 2.

If neither the P block nor the Q block is encoded in the intra mode, the process (1100) proceeds to (S1102) to determine whether the P block or the Q block has non-zero coefficients. If either the P or Q block has non-zero coefficients, the BS value is set to 1.

If neither the P block nor the Q block has non-zero coefficients, the process (1100) proceeds to (S1104) to determine whether the P block and the Q block have a different reference picture. If the P block and Q block have different reference pictures, the BS value is set to 1.

If the P block and the Q block have the same reference pictures, the process (1100) proceeds to (S1106) to determine if the P block and the Q block have a different number of motion vectors. If the P block and the Q block have a different number of motion vectors, the BS value is set to 1.

If the P block and the Q block have the same number of motion vectors, the process (1100) proceeds to (S1108) where one or more conditions determines whether the BS value is set to 1 or 0. For example, when a MV difference is below a threshold T, the BS value is set to 0. The threshold T may be set to 1 pixel. A MV precision may be ¼ pixel, and thus, 1 pixel is 4 times the MV precision and the threshold T is set to 4. In another example, the MV precision is 1/16, and the threshold is set to 16. In (S1108), MV_P is a motion vector of the P block, MV_Q is a motion vector of the Q block. In an example, when the |MV_P−MV_Q|≥4 (or 1 pixel), the BS value is set to 1. When the |MV_P−MV_Q|<4, the BS value is set to 0.

In an embodiment, a BS value is calculated on a 4×4 block basis, and can be re-mapped to an 8×8 grid. In an example, a vertical edge divides an 8×8 block at a center of the 8×8 block. The 8×8 block includes a top left 4×4 block (referred to as P1), a top right 4×4 block (referred to as Q1), a bottom left 4×4 block (referred to as P2), and a bottom right 4×4 block (referred to as Q2). Accordingly, a top portion of the 8×8 block includes P1 and Q1, and a first BS value, BS1, can be determined based on P1 and Q1. Similarly, a bottom portion of the 8×8 block includes P2 and Q2, and a second BS value, BS2, can be determined based on P2 and Q2. Therefore, a BS value for the vertical edge in the 8×8 block can be a maximum of the two BS values, BS1 and BS2 (i.e., max(BS1, BS2)).

In some examples, constraints over DMVR can be implemented to mitigate a pipeline latency issue due to the dependency between an initial MV of a current block and refined MVs in previously coded blocks.

In an embodiment, motion information is stored at a 4×4 block level for coding a current picture. The motion information can include one or more MVs, reference picture information, prediction direction such as uni-prediction, bi-prediction, and/or the like. Due to inter prediction, motion information is also stored for a reference picture. To reduce a MV storage space for motion information in the reference picture, MV compression can be used so that the motion information in the reference picture is stored at a 16×16 block level and motion information of a top-left 4×4 block in a 16×16 block is used as representative motion information for the 16×16 block. Accordingly, the MV storage space for the reference picture is reduced by a factor of 16 and the motion information of the reference picture is compressed.

To improve coding efficiency of the MV compression, another method to determine the representative motion information can be used. When a 4×4 block at a representative position in the 16×16 block is not an inter block (i.e., a block that is predicted using inter prediction), no motion information is associated with the 4×4 block, and thus, motion information of a spatial neighbor of the 4×4 block can be used as the representative motion information of the 16×16 block.

According to embodiments of the disclosure, the MV compression can be extended to the current picture, and thus, the motion information of the current picture and previously coded reference pictures can be compressed.

In an embodiment, a current block in a current picture is coded in an inter prediction mode based on a reference block that is previously coded. The reference block can be a spatial or a temporal neighbor of the current block. According to embodiments of the disclosure, the reference block is one of a plurality of blocks in a motion vector compression unit (MVCU) that is already coded. The MVCU is in the current picture when the reference block is the spatial neighbor, and the MVCU is in a reference picture that is different from the current picture when the reference block is the temporal neighbor. The plurality of blocks in the MVCU can be coded based on multiple pieces of motion information. In an embodiment, representative motion information for the MVCU can be selected from the multiple pieces of motion information corresponding to the plurality of blocks and used to represent the multiple pieces of motion information. In an example, only the representative motion information is stored in the MV storage space, and thus, the multiple pieces of motion information of the MVCU are compressed into the representative motion information for the MVCU. Therefore, the MV storage space to store motion information for the MVCU is reduced. Further, the MVCU can be in the current picture, thus, the MV storage space for the current picture and the previously coded reference pictures can be reduced.

In an example, four 4×4 blocks are in the MVCU where the MVCU is a 8×8 block. Without the MV compression, 4 pieces of motion information corresponding to the four 4×4 blocks are stored and occupy a first MV storage space. With the MV compression, representative motion information for the MVCU can be selected based on the 4 pieces of motion information. In an example, only the representative motion information for the MVCU is stored and occupies a second MV storage space where the second MV storage space can be ¼ of the first MV storage space.

Further, current motion information of the current block can be determined based on the representative motion information for the MVCU, and at least one sample in the current block can be reconstructed based on the current motion information.

Any suitable method can be used to determine the representative motion information for the MVCU based on the multiple pieces of motion information corresponding to the plurality of blocks in the MVCU. Accordingly, any suitable motion information can be used as the representative motion information for the MVCU, such as described below. In the description below, a size of the MVCU can be $2^M \times 2^N$ and a size of each of the plurality of blocks can be $2^X \times 2^X$, where M, N, and X are positive integers, and X is less than either M or N. For example, X is 2, M is 3, N is 3, then each of the plurality of blocks is a 4×4 block and the MVCU is an 8×8 block. The description below can be suitably adapted to other sizes and shapes of the MVCU and the plurality of blocks.

In a first embodiment, the selected representative motion information occurs most frequently in the multiple of pieces of motion information corresponding to the plurality of blocks. For example, four 4×4 blocks are in the MVCU where the MVCU is an 8×8 block. Four pieces of motion information corresponding to the four 4×4 blocks have four MVs, i.e., (0,0), (1,1), (0,0), and (−1,2), respectively. Other motion information of the four pieces of motion information is identical, thus, the motion information having the MV (0, 0) occurs most frequently among the four pieces of motion information. Therefore, the representative motion information is the motion information having the MV (0, 0).

Figure 12:
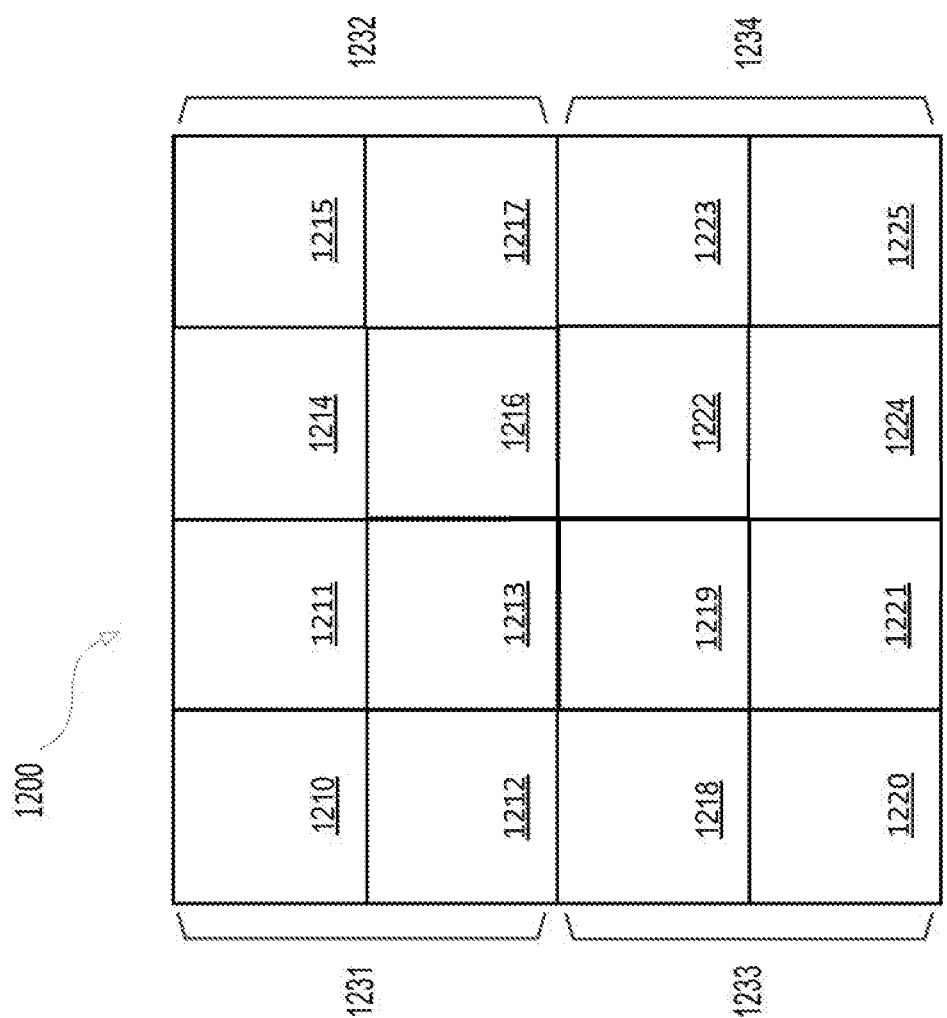
FIG. 12 shows an example of a motion vector compression unit (MVCU).

In a second embodiment, as shown in FIG. 12, a MVCU (1200) having the size of $2^M \times 2^N$ includes a top left $2^{M-1} \times 2^{N-1}$ part (1231), a top right $2^{M-1} \times 2^{N-1}$ part (1232), a bottom left $2^{M-1} \times 2^{N-1}$ part (1233), and a bottom right $2^{M-1} \times 2^{N-1}$ part (1234). The MVCU (1200) includes a plurality of blocks (1210)-(1225) corresponding to multiple pieces of motion information. The top left $2^{M-1} \times 2^{N-1}$ part (1231) includes the blocks (1210)-(1213), the top right $2^{M-1} \times 2^{N-1}$ part (1232) includes the blocks (1214)-(1217), the bottom left $2^{M-1} \times 2^{N-1}$ part (1233) includes the blocks (1218)-(1221), and the bottom right $2^{M-1} \times 2^{N-1}$ part (1234) includes the blocks (1222)-(1225). Representative motion information for the MVCU (1200) can be selected based on a location of one of the plurality of blocks (1210)-(1225). For example, the representative motion information for the MVCU (1200) can be selected to be one of the multiple pieces of motion information that is associated with a center block of the plurality of blocks (1210)-(1225). The center block can be one of: (1) a bottom right block (i.e., the block (1213)) of the top left $2^{(M-1)} \times 2^{(N-1)}$ part (1231), (2) a bottom left block (i.e., the block (1216)) of the top right $2^{(M-1)} \times 2^{(N-1)}$ part (1232), (3) a top right block (i.e., the block (1219)) of the bottom left $2^{(M-1)} \times 2^{(N-1)}$ part (1233), and (4) a top left block (i.e., the block (1222)) of the bottom right $2^{(M-1)} \times 2^{(N-1)}$ part (1234).

In an example, the multiple pieces of motion information in FIG. 12 includes 16 pieces of motion information corresponding to the plurality of blocks (1210)-(1225) and the center block is the block (1213). Accordingly, without the MV compression, 16 pieces of motion information are saved in the MV storage space. However, with the MV compression, only the motion information of the block (1213) (i.e., the representative motion information for the MVCU (1200)) is saved in the MV storage space, reducing the MV storage space to 1/16 of that without the MV compression. In other words, only the motion information for the block (1213) is saved in the MV storage space and can be used for predicting the current block. For example, when the reference block is the block (1220), the current motion information of the current block is determined based on the motion information of the block (1213) (i.e., the representative motion information of the MVCU (1200)) and not based on the motion information of the block (1220) (i.e., the reference block). Accordingly, with the MV compression, certain MV predictors from spatial neighbors (e.g., the blocks (1210)-(1212) and (1214)-(1225) when the MVCU (1200) is in the current picture) or temporal neighbors (e.g., the blocks (1210)-(1212) and (1214)-(1225) when the MVCU (1200) is in the reference picture) of the current block are not used or are substituted when predicting the current motion information of the current block.

When the representative motion information described in the first embodiment is not available, the representative motion information described in the second embodiment can be used for the MVCU. When the representative motion information described in the second embodiment is not available, the representative motion information described in the first embodiment can be used for the MVCU. When the representative motion information described in the first embodiment is not available and the representative motion information described in the second embodiment is also not available, the representative motion information for the MVCU is considered as unavailable and no MV compression is implemented.

In a third embodiment, a first available one of the multiple pieces of motion information can be selected, based on a scan order, to be the representative motion information for the MVCU. The scan order can be any suitable scan order, such as a raster scan order, a Z scan order, or a decoding order for the MVCU. In an example, for a MVCU that includes the blocks 0-3 shown in FIG. 10A-10B, the decoding order is from the block 0 to block 3.

In an embodiment, the multiple pieces of motion information includes first MVs associated with a first reference list (also referred to as a list 0) and second MVs associated with a second reference list (also referred to as a list 1). One of the first MVs occurring most frequently in the first MVs can be selected to be a representative first MV for the MVCU. Similarly, one of the second MVs occurring most frequently in the second MVs can be selected to be a representative second MV for the MVCU. The representative motion information for the MVCU can be determined based on the representative first MV and the representative second MV. The above description can be suitably adapted to a multi-hypothesis case where the multiple pieces of motion information also include additional MVs associated with additional one or more reference lists. In an example, the multiple pieces of motion information also include third MVs associated with a third reference list, one of the third MVs occurring most frequently in the third MVs can be selected to be a representative third MV for the MVCU. Further, the representative motion information for the MVCU can be determined based on the representative first MV, the representative second MV, and the representative third MV.

In an embodiment, no motion information is available for one of the plurality of blocks in the MVCU, for example, when the one of the plurality of blocks is predicted using an intra mode.

Accordingly, in an example, the motion information for the one of the plurality of blocks is considered unavailable.

In an example, one or more MVs for the one of the plurality of blocks is set to be zero. A reference index can be assigned to the one of the plurality of blocks. When the one of the plurality of blocks is in a P slice, a uni-directional zero MV can be used, and the reference index is assigned as 0. When the one of the plurality of blocks is in a B slice, bi-directional zero MVs can be used, and the reference index is assigned as 1 if more than one reference pictures are in the corresponding reference list.

In an example, the motion information for the one of the plurality of blocks can be determined from a spatial neighbor of the one of the plurality of blocks where the spatial neighbor can be another one of the plurality of blocks in the MVCU. The motion information of the one of the plurality of blocks can be determined as first available motion information searched using a scan order, such as the scan order described in the third embodiment. If no motion information is available from the search, the motion information of the one of the plurality of blocks is marked as unavailable. Alternatively, the MV of the one of the plurality of blocks is set to zero with the reference index as 0 if no motion information is available from the search. The zero MV can be bi-predicted or uni-predicted in B slices.

In an example, the motion information for the one of the plurality of blocks can be determined from a location in a collocated block in a collocated picture of the current picture. In an example, the collocated block in the collocated picture can be derived in the same way as in deriving a temporal MV candidate where the collocated picture (also referred to as the collocated reference picture) is a reference picture in a reference picture list of the current picture. The collocated picture can be a special reference picture in the reference picture list and can be determined in a header of a picture, a slice, a slice group, a tile, or the like. In an example, information used to derive the collocated picture is signaled in the slice header. The location can be pre-defined and can be a top-left 4×4 block, a center 4×4 block of the collocated block, similar to the center block described with reference to FIG. 12.

In an example, the motion information for the one of the plurality of blocks can be determined by selecting the representative motion information for the MVCU to be the motion information for the one of the plurality of blocks. The representative motion information can be regarded as unavailable in a deblocking process. Other blocks may use the motion information for the one of the plurality of blocks as a MV predictor.

In an embodiment, the MVCU is included in a CTB. The representative motion information for the MVCU is determined after reconstructing the CTB. Therefore, when the current block is in the CTB and is predicted based on the spatial neighbor in the MVCU where the MVCU is also in the CTB, the current block is predicted prior to the MV compression of the CTB and based on motion information of the spatial neighbor, which may not be identical to the representative information for the MVCU. In some examples, the motion information of the spatial neighbor can predict the current block more accurately than the representative information for the MVCU. On the other hand, when the current block is in a current CTB and the current block is predicted based on the spatial neighbor in the MVCU that is in a previously reconstructed CTB, the current block is predicted after the MV compression of the previously reconstructed CTB and based on the representative information for the MVCU, which can be different from the motion information of the spatial neighbor.

In an embodiment, the MVCU can be applied in a DMVD mode where the multiple pieces of motion information corresponding to the plurality of blocks include unrefined pieces of motion information and/or refined pieces of motion information corresponding to the plurality of blocks. The refined pieces of motion information can be determined from the respective unrefined pieces of motion information using the DMVD, such as the examples shown in FIGS. 8-10.

The MV compression can be applied to the unrefined pieces of motion information and/or the refined pieces of motion information corresponding to the plurality of blocks. In an example, the unrefined pieces of motion information are compressed, and thus, one of the unrefined pieces of motion information can be selected as the representative motion information for the MVCU. Therefore, the one of the unrefined pieces of motion information can be stored, and remaining unrefined pieces of motion information are not stored.

In an example, the refined pieces of motion information are compressed, and thus, one of the refined pieces of motion information can be selected as the representative motion information for the MVCU. Therefore, the one of the refined pieces of motion information can be stored, and remaining refined pieces of motion information are not stored.

In an example, both the refined and unrefined pieces of motion information are compressed, and thus, the one of the refined pieces of motion information can be selected as the representative motion information for the MVCU to represent the refined pieces of motion information. The one of the unrefined pieces of motion information can be selected as the representative motion information for the MVCU to represent the unrefined pieces of motion information.

In an example, the reference block is a spatial or a temporal neighbor of the current block. When the reference block is the spatial neighbor, then the MVCU is in the current picture, the representative motion information for the MVCU includes the one of the unrefined pieces of motion information, and the current motion information of the current block can be determined based on the one of the unrefined pieces of motion information for the MVCU (i.e., the representative motion information for the MVCU). When the reference block is the temporal neighbor, then the MVCU is in a reference picture, the representative motion information for the MVCU includes the one of the refined pieces of motion information, and the current motion information of the current block can be determined based on the one of the refined pieces of motion information for the MVCU (i.e., the representative motion information for the MVCU).

When a block is regarded as in the DMVD mode, the following restrictions can apply. The block can be considered as in the DMVD mode if the block is coded in a bi-prediction merge mode (i.e., a merge mode associated with a bi-prediction technique), the bi-prediction is from different directions, and the block is not in a sub-block mode where the motion information of the block is represented on a sub-block level. The sub-block mode can correspond to an affine mode using affine motion compensation, an alternative temporal motion vector prediction (ATMVP), or the like. Further restrictions may be applied. For example, during the MV compression, if the block is not in the DMVD mode, then the MVs associated with the block are considered as invalid.

In an embodiment, during the MV compression, when motion information of one of the plurality of blocks in the MVCU is invalid or unavailable, the one of the plurality of blocks in the MVCU is discarded in the MV compression, and thus, the motion information of one of the plurality of blocks in the MVCU is excluded from the multiple pieces of motion information from which the representative motion information for the MVCU is selected.

Figure 13:
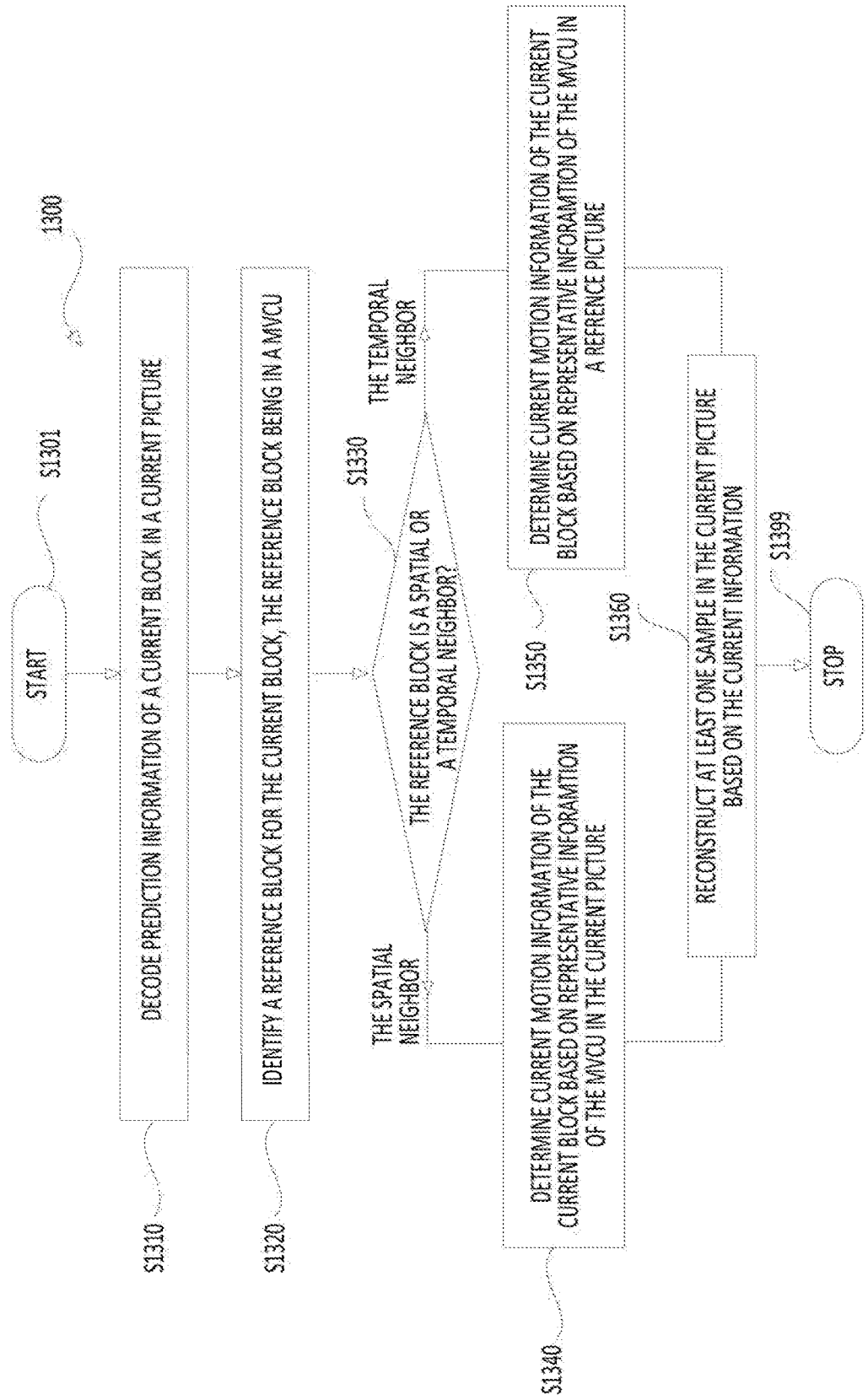
FIG. 13 shows a flow chart outlining a process (1300) according to an embodiment of the disclosure.

FIG. 13 shows a flow chart outlining a process (1300) according to an embodiment of the disclosure. The process (1300) can be used in the reconstruction of a current block coded in an inter prediction mode. In various embodiments, the process (1300) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (1300) is implemented in software instructions, thus when the processing circuitry executes the software instructions, the processing circuitry performs the process (1300). The process starts at (S1301) and proceeds to (S1310).

At (S1310), prediction information of the current block in a current picture is decoded from a coded video bitstream. The prediction information can indicate the inter prediction mode used for reconstructing the current block.

At (S1320), a reference block for the current block can be identified. The reference block is used to predict the current block. The reference block can be one of a plurality of blocks in a MVCU that is already reconstructed.

At (S1330), whether the reference block is a spatial or a temporal neighbor of the current block is determined. When the reference block is determined to be the spatial neighbor of the current block, the process (1300) proceeds to (S1340). When the reference block is determined to be the temporal neighbor of the current block, the process (1300) proceeds to (S1350).

At (S1340), the reference block is the spatial neighbor, and thus, the MVCU is in the current picture. Further, current motion information of the current block can be determined based on representative motion information for the MVCU. The process (1300) then proceeds to (S1360).

At (S1350), the reference block is the temporal neighbor, and thus, the MVCU is in a reference picture that is different from the current picture. The reference picture is previously reconstructed. Further, the current motion information of the current block can be determined based on the representative motion information for the MVCU. The process (1300) then proceeds to (S1360).

In steps (S1340) and (S1350), the current motion information of the current block can be determined based on the representative motion information for the MVCU, which can be different from motion information used to reconstruct the reference block.

At (S1360), at least one sample in the current block can be reconstructed based on the current motion information. The process (1300) then proceeds to (S1399), and terminates.

Note that the process (1300) can be suitably adapted. For example, prior to determining the current motion information in the steps (S1340) and (S1350), the representative motion information for the MVCU can be selected from multiple pieces of motion information used to reconstruct the plurality of blocks. In order to reduce a MV storage space, only the representative motion information for the MVCU is stored in the MV storage space and used to determine the current motion information of the current block in the steps (S1340) and (S1350). Remaining pieces of the multiple pieces of motion information are not stored. Various methods can be used to select the representative motion information for the MVCU from the multiple pieces of motion information, as described above.

When the MVCU is in the DMVD mode, the process (1300) can be further adapted as below. The representative motion information for the MVCU can be selected from one of unrefined pieces of motion information. Accordingly, at (S1340), the current motion information of the current block can be determined based on the one of the unrefined pieces of motion information for the MVCU. Alternatively, the representative motion information for the MVCU can be selected from one of refined pieces of motion information. Accordingly, at (S1350), the current motion information of the current block can be determined based on the one of the refined pieces of motion information for the MVCU.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
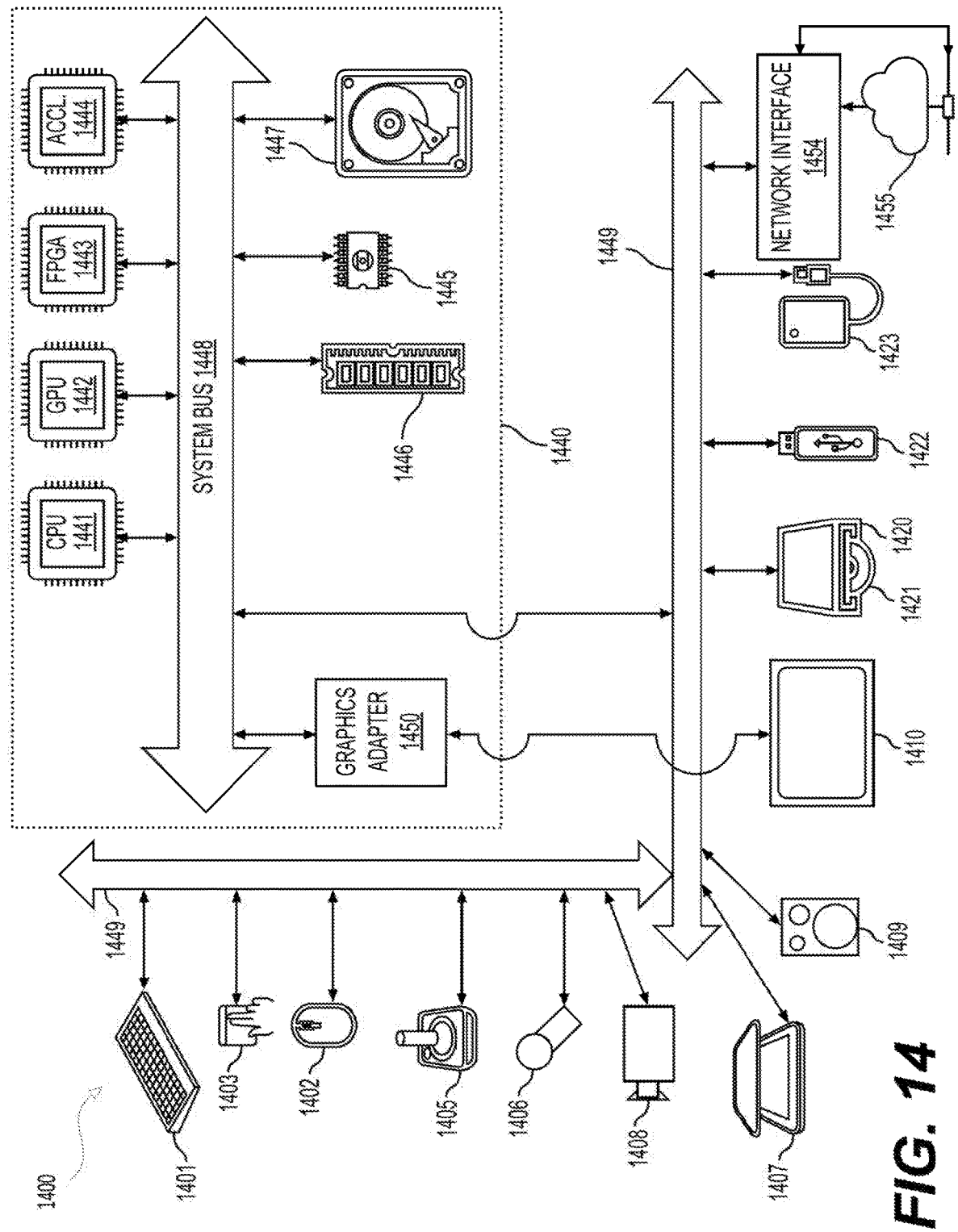
FIG. 14 is a schematic illustration of a computer system in accordance with an embodiment.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data, ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through the peripheral buses (1449). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can be also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hard-wired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
decoding prediction information of a current block in a current picture from a coded video bitstream, the prediction information indicating an inter prediction mode for reconstructing the current block,
identifying a reference block for the current block, the reference block being one of a plurality of blocks in a motion vector compression unit (MVCU) that is already reconstructed, wherein a size of the MVCU is $2^M \times 2^N$ and a size of each of the plurality of blocks is $2^X \times 2^X$, where M, N, and X are positive integers, and X is less than either M or N, the reference block is a spatial neighbor of the current block, and the MVCU is in the current picture;
determining current motion information of the current block based on representative motion information for an entirety of the MVCU and not based on motion information of the reference block, wherein a same motion vector compression mechanism is used to compress respective motion information for the current picture and a reference picture for the current block; and reconstructing at least one sample in the current block based on the current motion information, wherein the method further comprises, prior to determining the current motion information, determining the representative motion information for the entirety of the MVCU from multiple pieces of motion information, the multiple pieces of motion information including first MVs associated with a first reference list and second MVs associated with a second reference list; and determining the representative motion information further includes
- selecting one of the first MVs occurring most frequently in the first MVs to be a representative first MV for the MVCU;
- selecting one of the second MVs occurring most frequently in the second MVs to be a representative second MV for the MVCU; and
- determining the representative motion information for the MVCU based on the representative first MV and the representative second MV.

2. The method of claim 1, wherein
the MVCU includes a top left $2^{M-1} \times 2^{N-1}$ part, a top right $2^{M-1} \times 2^{N-1}$ part, a bottom left $2^{M-1} \times 2^{N-1}$ part, and a bottom right $2^{M-1} \times 2^{N-1}$ part; and
determining the representative motion information further includes selecting one of the multiple pieces of motion information that is associated with a center block of the plurality of blocks to be the representative motion information for the MVCU, the center block being one of: (1) a bottom right block of the top left $2^{(M-1)} \times 2^{(N-1)}$ part, (2) a bottom left block of the top right $2^{(M-1)} \times 2^{(N-1)}$ part, (3) a top right block of the bottom left $2^{(M-1)} \times 2^{(N-1)}$ part, and (4) a top left block of the bottom right $2^{(M-1)} \times 2^{(N-1)}$ part.

3. The method of claim 1, wherein selecting the representative motion information further comprises:
selecting, based on a scan order, a first available one of the multiple pieces of motion information to be the representative motion information for the MVCU, the scan order being one of: (1) a raster scan order, (2) a Z scan order, and (3) a decoding order for the MVCU.

4. The method of claim 1, wherein
one of the plurality of blocks has no motion information; and
the method further includes:
- determining that motion information for the one of the plurality of blocks is unavailable;
- setting one or more MVs for the one of the plurality of blocks as zero and assigning a reference index to the one of the plurality of blocks;
- determining the motion information for the one of the plurality of blocks from a spatial neighbor of the one of the plurality of blocks, the spatial neighbor being another one of the plurality of blocks in the MVCU;
- determining the motion information for the one of the plurality of blocks from a collocated block in a collocated picture; or
- selecting the representative motion information for the MVCU to be the motion information for the one of the plurality of blocks.

5. The method of claim 1, wherein
the MVCU is included in a coding tree block (CTB); and
determining the representative motion information for the MVCU further includes, after reconstructing the CTB, determining the representative motion information for the MVCU from the multiple pieces of motion information selected from the plurality of blocks.

6. The method of claim 1, wherein
the MVCU is in a decoder side motion vector derivation (DMVD) mode;
the multiple pieces of motion information selected from the plurality of blocks include unrefined pieces of motion information and refined pieces of motion information corresponding to the plurality of blocks, the refined pieces of motion information being determined from the respective unrefined pieces of motion information using the DMVD; and
determining the representative motion information for the MVCU includes one of: (1) selecting one of the unrefined pieces of motion information to be the representative motion information for the MVCU, (2) selecting one of the refined pieces of motion information to be the representative motion information for the MVCU, and (3) selecting one of the unrefined pieces of motion information and one of the refined pieces of motion information to be the representative motion information for the MVCU.

7. The method of claim 6, wherein the representative motion information for the MVCU includes the one of the unrefined pieces of motion information, and determining the current motion information includes determining the current motion information based on the one of the unrefined pieces of motion information for the MVCU.

8. An apparatus for video decoding, comprising:
processing circuitry configured to:
- decode prediction information of a current block in a current picture from a coded video bitstream, the prediction information indicating an inter prediction mode for reconstructing the current block;
- identify a reference block for the current block, the reference block being one of a plurality of blocks in a motion vector compression unit (MVCU) that is already reconstructed, wherein a size of the MVCU is $2^M \times 2^N$ and a size of each of the plurality of blocks is $2^X \times 2^X$, where M, N, and X are positive integers, and X is less than either M or N, the reference block is a spatial neighbor of the current block, and the MVCU is in the current picture;
- determine current motion information of the current block based on representative motion information for an entirety of the MVCU and not based on motion information of the reference block, wherein a same motion vector compression mechanism is used to compress respective motion information for the current picture and a reference picture for the current block; and
- reconstruct at least one sample in the current block based on the current motion information, wherein
the processing circuitry is further configured to, prior to determining the current motion information, determine the representative motion information for the entirety of the MVCU from multiple pieces of motion information, the multiple pieces of motion information including first MVs associated with a first reference list and second MVs associated with a second reference list; and the processing circuitry is further configured to determine the representative motion information by
selecting one of the first MVs occurring most frequently in the first MVs to be a representative first MV for the MVCU;
selecting one of the second MVs occurring most frequently in the second MVs to be a representative second MV for the MVCU; and
determining the representative motion information for the MVCU based on the representative first MV and the representative second MV.

9. The apparatus of claim 8, wherein
the MVCU includes a top left $2^{M-1} \times 2^{N-1}$ part, a top right $2^{M-1} \times 2^{N-1}$ part, a bottom left $2^{M-1} \times 2^{N-1}$ part, and a bottom right $2^{M-1} \times 2^{N-1}$ part; and
the processing circuitry is further configured to select one of the multiple pieces of motion information that is associated with a center block of the plurality of blocks to be the representative motion information for the MVCU, the center block being one of: (1) a bottom right block of the top left $2^{(M-1)} \times 2^{(N-1)}$ part, (2) a bottom left block of the top right $2^{(M-1)} \times 2^{(N-1)}$ part, (3) a top right block of the bottom left $2^{(M-1)} \times 2^{(N-1)}$ part, and (4) a top left block of the bottom right $2^{(M-1)} \times 2^{(N-1)}$ part.

10. The apparatus of claim 8, wherein the processing circuitry is further configured to select, based on a scan order, a first available one of the multiple pieces of motion information to be the representative motion information for the MVCU, the scan order being one of: (1) a raster scan order, (2) a Z scan order, and (3) a decoding order for the MVCU.

11. The apparatus of claim 8, wherein
one of the plurality of blocks has no motion information; and
the processing circuitry is further configured to:
determine that motion information for the one of the plurality of blocks is unavailable;
set one or more MVs for the one of the plurality of blocks as zero and assigning a reference index to the one of the plurality of blocks;
determine the motion information for the one of the plurality of blocks from a spatial neighbor of the one of the plurality of blocks, the spatial neighbor being another one of the plurality of blocks in the MVCU;
determine the motion information for the one of the plurality of blocks from a collocated block in a collocated picture; or
select the representative motion information for the MVCU to be the motion information for the one of the plurality of blocks.

12. The apparatus of claim 8, wherein
the MVCU is in a decoder side motion vector derivation (DMVD) mode;
the multiple pieces of motion information selected from the plurality of blocks include unrefined pieces of motion information and refined pieces of motion information corresponding to the plurality of blocks, the refined pieces of motion information being determined from the respective unrefined pieces of motion information using the DMVD; and
the processing circuitry is further configured to perform one of: (1) selecting one of the unrefined pieces of motion information to be the representative motion information for the MVCU, (2) selecting one of the refined pieces of motion information to be the representative motion information for the MVCU, and (3) selecting one of the unrefined pieces of motion information and one of the refined pieces of motion information to be the representative motion information for the MVCU.

13. A non-transitory computer-readable storage medium storing a program executable by at least one processor to perform a method comprising:
decoding prediction information of a current block in a current picture from a coded video bitstream, the prediction information indicating an inter prediction mode for reconstructing the current block,
identifying a reference block for the current block, the reference block being one of a plurality of blocks in a motion vector compression unit (MVCU) that is already reconstructed, wherein a size of the MVCU is $2^M \times 2^N$ and a size of each of the plurality of blocks is $2^X \times 2^X$, where M, N, and X are positive integers, and X is less than either M or N, the reference block is a spatial neighbor of the current block, and the MVCU is in the current picture;
determining current motion information of the current block based on representative motion information for an entirety of the MVCU and not based on motion information of the reference block, wherein a same motion vector compression mechanism is used to compress respective motion information for the current picture and a reference picture for the current block; and
reconstructing at least one sample in the current block based on the current motion information,
wherein the method further comprises, prior to determining the current motion information, determining the representative motion information for the entirety of the MVCU from multiple pieces of motion information, the multiple pieces of motion information including first MVs associated with a first reference list and second MVs associated with a second reference list; and
determining the representative motion information further includes
selecting one of the first MVs occurring most frequently in the first MVs to be a representative first MV for the MVCU;
selecting one of the second MVs occurring most frequently in the second MVs to be a representative second MV for the MVCU; and
determining the representative motion information for the MVCU based on the representative first MV and the representative second MV.

* * * * *